US012807095B2

(12) United States Patent
Krauss et al.

(10) Patent No.: US 12,807,095 B2
(45) Date of Patent: Nov. 24, 2026

(54) END-FITTING TENSIONER

(71) Applicant: Joyson Safety Systems Germany GmbH, Aschaffenburg (DE)

(72) Inventors: Walter Krauss, Ichenhausen (DE); Oliver Grimm, Neu-Ulm (DE)

(73) Assignee: Joyson Safety Systems Germany GmbH, Aschaffenburg (DE)

( * ) Notice: Subject to any disclaimer, the term of this patent is extended or adjusted under 35 U.S.C. 154(b) by 0 days.

(21) Appl. No.: 19/285,945

(22) Filed: Jul. 30, 2025

(65) Prior Publication Data

US 2026/0070507 A1 Mar. 12, 2026

(30) Foreign Application Priority Data

Aug. 2, 2024 (DE) ..................... 10 2024 122 121.6

(51) Int. Cl.
*B60R 22/195* (2006.01)

(52) U.S. Cl.
CPC ...... *B60R 22/1952* (2013.01); *B60R 22/1951* (2013.01)

(58) Field of Classification Search
CPC ........................ B60R 22/1952; B60R 22/1951
See application file for complete search history.

(56) References Cited

U.S. PATENT DOCUMENTS

| | | | | |
|---|---|---|---|---|
| 10,166,947 | B2 * | 1/2019 | Clark | B60R 22/405 |
| 2001/0022330 | A1 * | 9/2001 | Mitsuo | B60R 22/44<br>242/372 |

FOREIGN PATENT DOCUMENTS

| | | | | | |
|---|---|---|---|---|---|
| DE | 102006018455 | B4 * | 8/2008 | B60R 22/4619 |
| DE | 10 2012 204 810 | B3 | 5/2013 | |
| DE | 10 2011 051 794 | B4 | 8/2014 | |
| DE | 10 2010 051 066 | B4 | 5/2017 | |
| DE | 10 2021 204 760 | A1 | 11/2022 | |
| GB | 2222068 | A * | 2/1990 | B60R 22/4619 |
| WO | WO-2013060438 | A1 * | 5/2013 | B60R 22/1952 |
| WO | WO-2013060439 | A1 * | 5/2013 | B60R 22/4619 |

OTHER PUBLICATIONS

Translation of DE102010051066 (Year: 2012).*

* cited by examiner

*Primary Examiner* — Jason D Shanske
*Assistant Examiner* — Shams Dhanani
(74) *Attorney, Agent, or Firm* — Howard N. Shipley; Gordon Rees Scully & Mansukhani, LLP

(57) ABSTRACT

An end-fitting tensioner for a safety belt including a tensioning device, a hollow belt shaft, and a locking device, which can lock within the belt shaft a fitting element attached in a tension-resistant manner to one end of the safety belt, wherein the hollow belt shaft includes an insertion slot, through which the fitting element can be inserted radially into the interior of the hollow belt shaft, wherein, when the fitting element is inserted into the hollow belt shaft, the locking device is triggered, and a movable locking element of the locking device is shifted from an unlocking position to a locking position, and wherein the locking position can be secured by a securing element. The securing element is attached to the locking element and is moved together with the locking element during the shifting of the locking element from the unlocking position into the locking position.

16 Claims, 13 Drawing Sheets

END-FITTING TENSIONER

Figure 1:
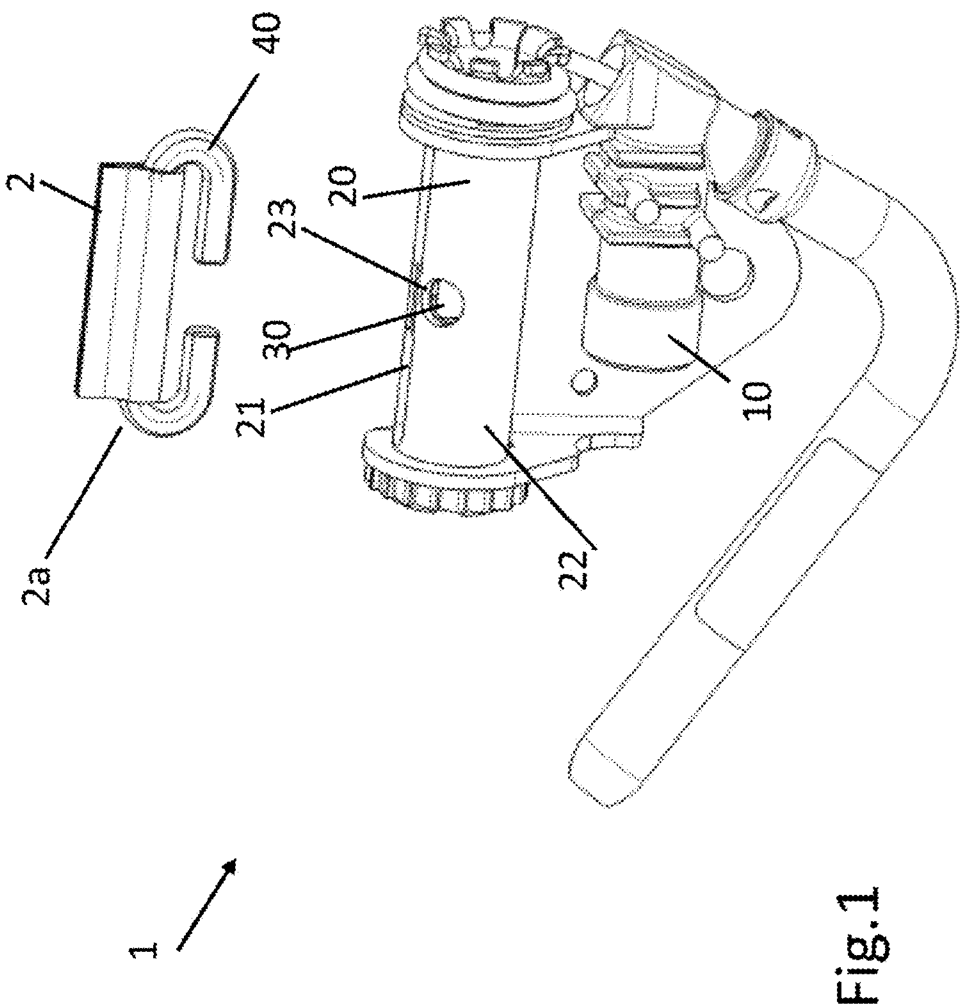

The present application claims the benefit and priority to German Patent DE 10 2024 122 121.6, filed on Aug. 2, 2024, the entire disclosure of which is hereby incorporated by reference herein.

The invention relates to an end-fitting tensioner for a safety belt comprising a tensioning device, a hollow belt shaft, which can be driven in the winding direction by the tensioning device, and a locking device, which can lock within the belt shaft a fitting element attached in a tension-resistant manner to one end of the safety belt, wherein the hollow belt shaft comprises an insertion slot, through which the fitting element attached to the safety belt can be inserted radially into the interior of the hollow belt shaft, wherein, when the fitting element is inserted into the hollow belt shaft, the locking device is triggered, and a movable locking element of the locking device is shifted from an unlocking position to a locking position that locks the fitting element in the belt shaft, and wherein the locking position can be secured by means of a securing element.

Such an end-fitting tensioner is known from German Patent DE 10 2012 204 810 B3.

It is the underlying object of the invention to specify an end-fitting tensioner with which incorrect assembly can be avoided in a particularly reliable manner.

This object is achieved according to the invention by means of an end-fitting tensioner having the features of Patent claim 1. Advantageous configurations of the end-fitting tensioner according to the invention are specified in dependent claims.

Thus, according to the invention, it is envisaged that the securing element is attached to the locking element and is moved together with the latter during the shifting of the locking element from the unlocking position of the locking element into the locking position of the locking element.

One significant advantage of the end-fitting tensioner according to the invention should be regarded as the fact that the position of the locking element can be discerned during assembly from the position of the securing element. A fitter can thus ascertain from the position of the securing element whether or not the locking element is already in the locking position and can delay the securing of the securing element until the locking element has in fact reached the locking position, something that the fitter can determine from the position of the securing element.

It is advantageous if the securing element is covered with respect to the outside and inaccessible on the assembly side in the unlocking position of the locking element, and is exposed to the outside and accessible on the assembly side only in the locking position of the locking element. Such a configuration prevents incorrect assembly in a particularly reliable manner.

It saves space if the locking element is arranged so as to be pivotable about a pivoting axis in the interior of the belt shaft, and is brought from the unlocking position into the locking position by pivoting about the pivoting axis.

It saves a particularly large amount of space if the securing element is arranged completely or at least in some section in the interior of the belt shaft and, when the locking element is pivoted about the pivoting axis, the securing element is also pivoted about the pivoting axis in the interior of the belt shaft.

The pivoting axis and the axis of rotation of the belt shaft are preferably coaxial or are preferably formed by the same axis.

In a first variant embodiment, which is regarded as particularly advantageous, the securing element is covered with respect to the outside by a wall section of a tubular belt shaft wall of the belt shaft in the unlocking position of the locking element, and is exposed to the outside and accessible on the assembly side via a through hole in the belt shaft wall in the locking position of the locking element.

It is advantageous if the securing element can be moved radially outwards in the locking position of the locking element, more specifically at least until it projects into a radially outer through hole in the belt shaft wall of the belt shaft, and subsequent pivoting of the securing element and thus of the locking element is blocked by a hole rim, delimiting the through hole, of the belt shaft wall.

The securing element is preferably a grub screw, which is screwed into the locking element and is arranged completely in the interior of the belt shaft in the unlocking position of the locking element and, in the locking position of the locking element, can be screwed radially outwards to such an extent, by being partially screwed out of the locking element, that an end of the grub screw remote from the locking element is blocked in respect of a pivoting movement by a hole rim, delimiting the through hole, of the belt shaft wall.

In another variant, which is regarded as particularly advantageous, or in addition, provision can be made for the securing element or a further securing element to be arranged partially outside the belt shaft and to project radially into the interior of the belt shaft through a tangentially extending elongate hole in the belt shaft wall and to be connected to the locking element by means of the inward-projecting section.

In the last-mentioned configuration, the securing element (or the further securing element) is preferably a screw which is screwed into the locking element, the screw head of which lies outside the belt shaft and, in the locking position of the locking element, secures the locking element in the locking position by being screwed further into the locking element or through the latter.

The elongate hole is preferably designed in such a way that it prevents further screwing into the locking element in the unlocking position of the locking element and allows it in the locking position of the locking element.

The elongate hole is preferably narrower in the region in which the securing element passes through the elongate hole in the unlocking position of the locking element than in the region in which the securing element passes through the elongate hole in the locking position of the locking element. For example, the elongate hole is preferably narrower than the screw head in the region in which a screw as a securing element passes through the elongate hole in the unlocking position of the locking element, and is preferably larger than the screw head in the region in which the screw passes through the elongate hole in the locking position of the locking element.

Irrespective of the specific configuration of the securing element, it is regarded as advantageous if the end of the securing element, in particular of the screw or grub screw, which is adjacent to the locking element (i.e. is radially on the inside) is provided with an end section which prevents the securing element from being moved, in particular prevents the screw or grub screw from being screwed, out of the locking element beyond a predetermined extent.

In respect of the configuration of the locking device, it is regarded as advantageous if the locking device comprises a spring mechanism, which spring-loads the locking element in the direction of the locking position, and the locking element is shifted from the unlocking position into the locking position by the spring force of the spring mechanism when the spring mechanism is released as the fitting element is inserted into the hollow belt shaft.

The spring mechanism is preferably formed by just a single spring, or the locking device preferably comprises just a single spring as a spring mechanism.

Figure 3:
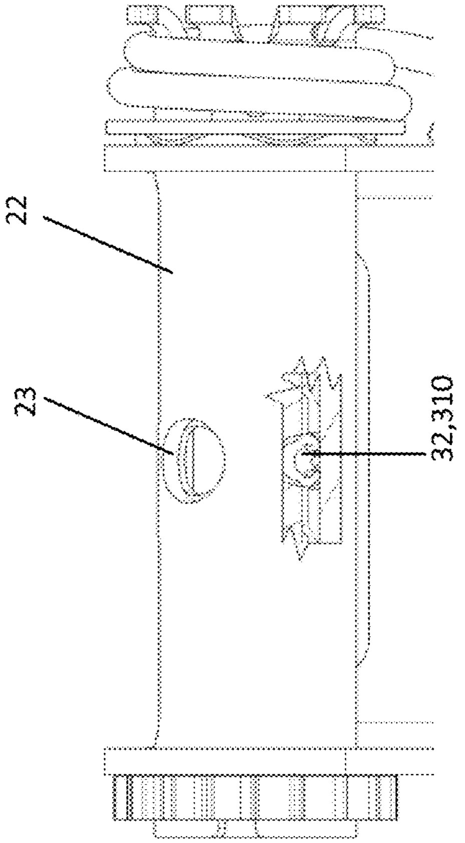
Figure 2:
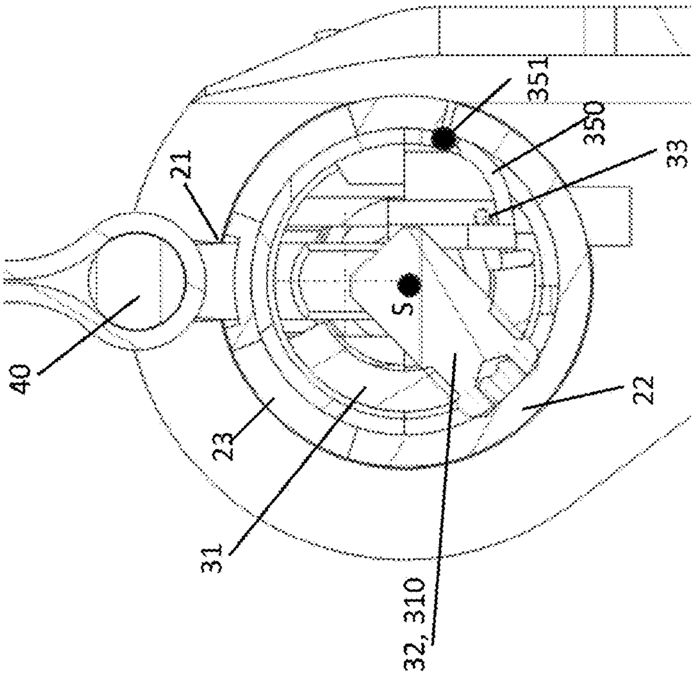
Figure 5:
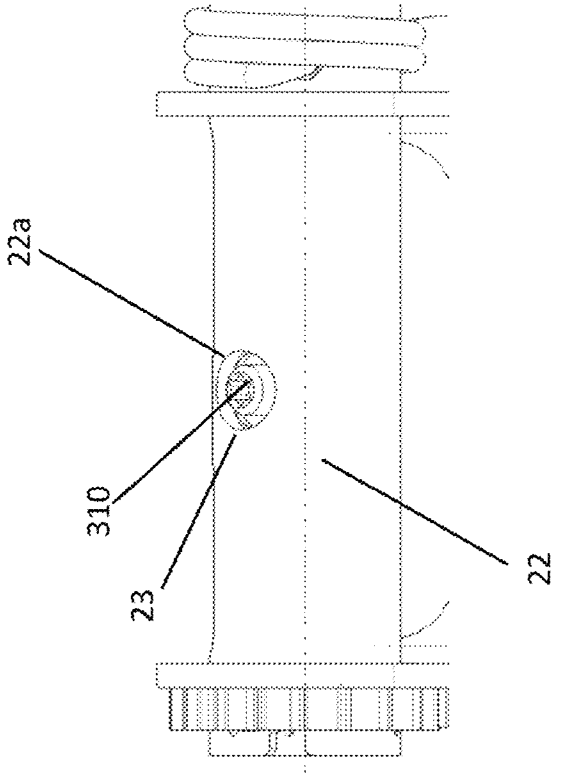
Figure 4:
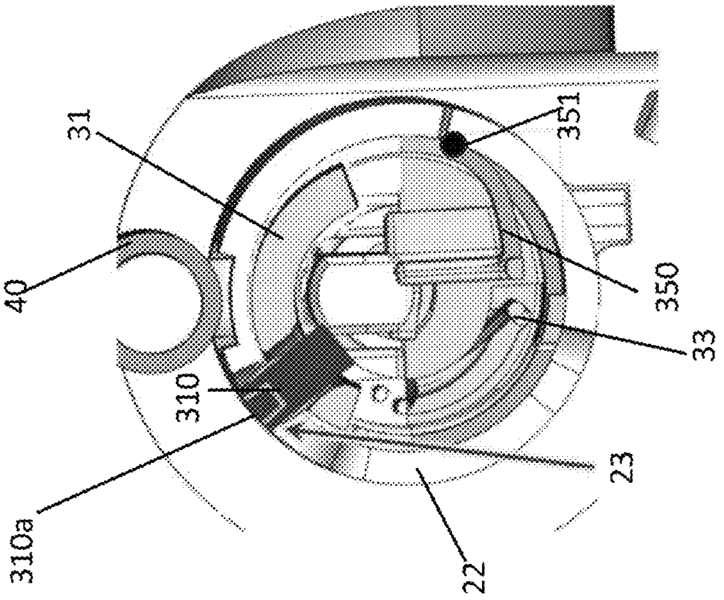
Figure 7:
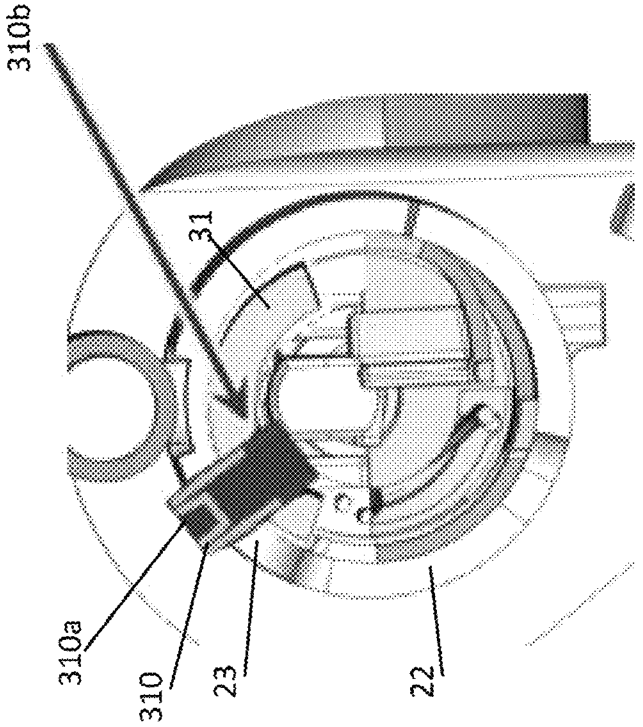
Figure 6:
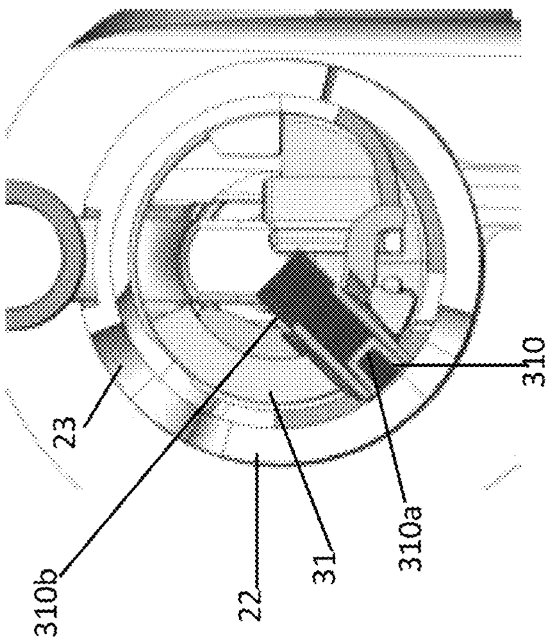
Figure 9:
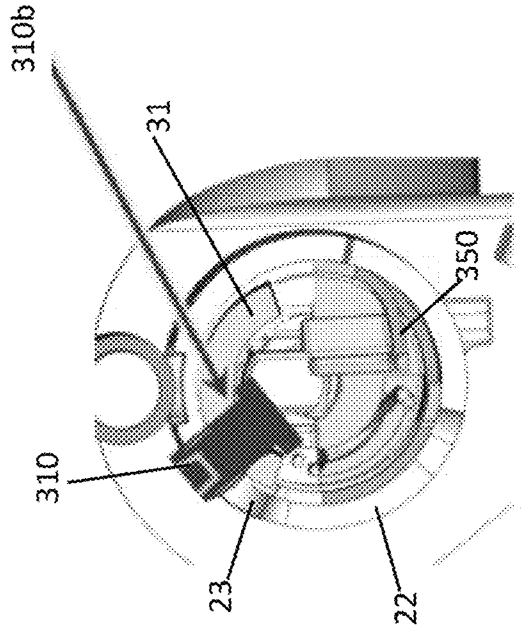
Figure 8:
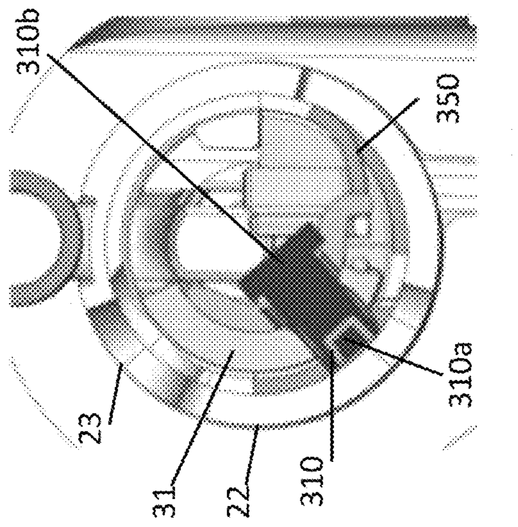
Figure 11:
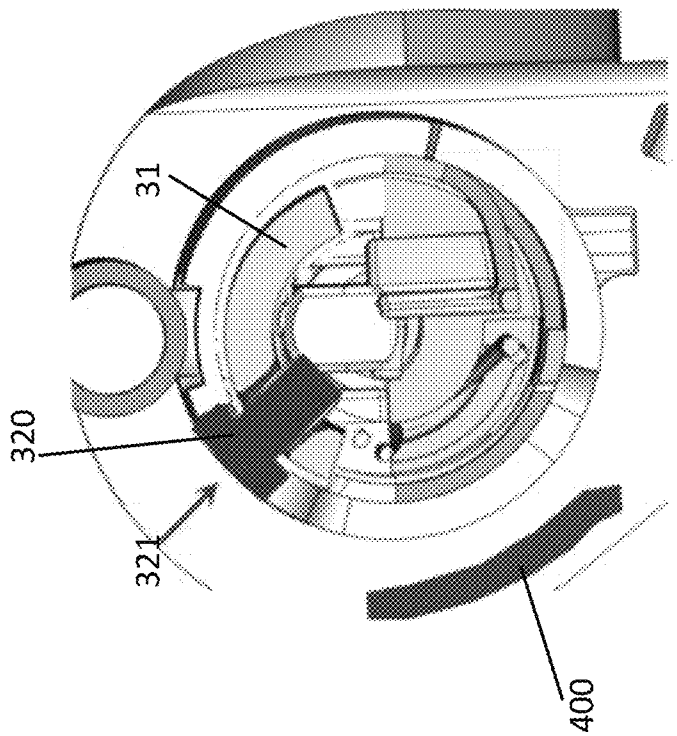
Figure 10:
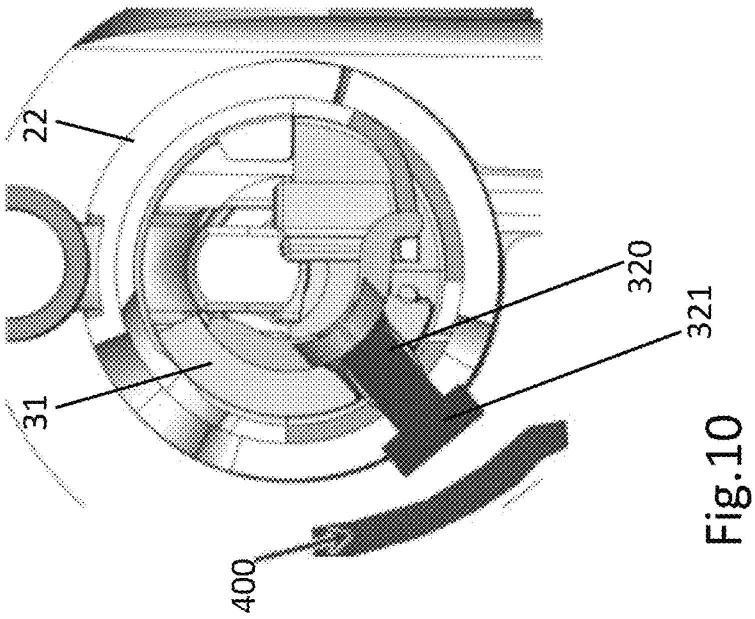
Figure 12:
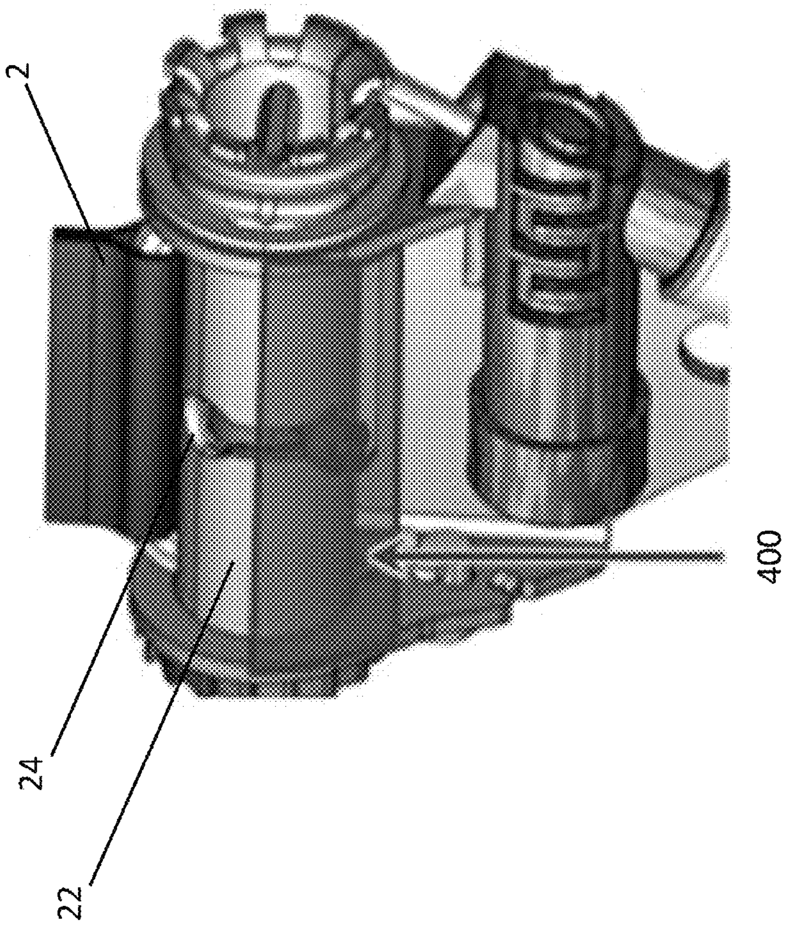

The invention is explained in greater detail below by means of exemplary embodiments; here, by way of example:

FIG. 1 shows components of a first exemplary embodiment for an end-fitting tensioner which is equipped with a securing element, FIGS. 2-5 show a first advantageous variant embodiment of the securing element, wherein FIGS. 2 and 3 shows the unlocking position and FIGS. 4 and 5 shows the locking position, FIGS. 6-7 show an advantageous configuration of an end section of the securing element in the case of a grub screw as a securing element, FIGS. 8-9 show another advantageous configuration of the end section of the securing element in the case of a grub screw as a securing element, FIGS. 10-12 show a second preferred variant embodiment of the securing element, FIGS. 13-16 show components of a second exemplary embodiment for an end-fitting tensioner which is equipped with a securing element, and FIGS. 17-23 show various advantageous configurations of the securing element in conjunction with the second exemplary embodiment shown in FIGS. 13 to 16.

For the sake of clarity, the same reference signs are always used in the figures for identical or comparable components.

FIG. 1 shows components of one exemplary embodiment of an end-fitting tensioner 1 according to the invention for a safety belt 2 in a three-dimensional illustration.

The end-fitting tensioner comprises a tensioning device 10, a hollow belt shaft 20, which can be driven in the winding direction by the tensioning device 10, and a locking device 30, which can lock within the belt shaft 20 a fitting element 40 attached in a tension-resistant manner to one end 2*a* of the safety belt 2. As the fitting element 40 is inserted into the hollow belt shaft 20 through an insertion slot 21 in the tubular belt shaft wall 22, the locking device 30 is triggered and locks the fitting element 40.

FIG. 2 shows a first preferred configuration of the locking device 30 in greater detail, wherein a state before locking is illustrated, in which a locking element 31 of the locking device 30 is still in its unlocking position, i.e. before the inserted fitting element 40 has unlocked an unlocking lever 350 of the locking device 30, said lever being pivotable about an axis 351, and a spring mechanism 33 of the locking device 30, which is not shown in detail for reasons of clarity, has shifted the locking element 31 into the locking position. The axis 351 and the pivotable unlocking lever 350 can be components of a film hinge, for example.

The locking element 31 is arranged so as to be pivotable about a pivoting axis S, which is preferably arranged coaxially with the axis of rotation of the belt shaft 20, in the interior of the belt shaft 20, and is brought from the unlocking position into the locking position by pivoting about the pivoting axis S.

The locking device 30 is furthermore equipped with a securing element 32, by means of which the locking position of the locking element 31 can be secured, thus ensuring that the locking element 31 can no longer leave the locking position. The securing element 32 is attached to the locking element 31 and is moved together with the latter in rotation during the shifting of the locking element 31 from the unlocking position into the locking position.

In a first preferred variant embodiment, the securing element 32 is formed by a grub screw 310, which is screwed into the locking element 31 and, in the unlocking position of the locking element 31, which is shown in FIGS. 2 and 3, is screwed so far or so deep through the locking element 31 that it is fully within the belt shaft 20 and is covered radially with respect to the outside by the tubular belt shaft wall 22.

FIG. 3 shows the belt shaft 22 in a three-dimensional illustration, likewise in the unlocking position of the locking element 31. It can be seen that a through hole 23 provided in the tubular belt shaft wall 22 is offset tangentially by a pivoting angle with respect to the grub screw 310, and assembly-side intervention radially from the outside through the through hole 23 into the interior of the belt shaft does not enable any action affecting the grub screw 310.

For comparison, FIG. 4 and 5 show the locking position of the locking element 31, i.e. the position thereof according to which, starting from the unlocking position shown in FIGS. 2 and 3, said element has been pivoted about the pivoting axis S. The pivoting angle of this rotary pivoting movement is dimensioned in such a way that the grub screw 310 is pivoted into the region of the through hole 23 and thus becomes accessible radially from the outside. Thus, after the locking element 31 has reached its locking position and has locked the fitting element 40, access to the grub screw 310 on the assembly side can take place, and the position of the locking element 31 can be secured.

In the first preferred variant embodiment, which is shown in FIGS. 2 to 5, the locking element 31 is secured by screwing the grub screw 310 partially, i.e. not fully, radially out of the locking element 31 until the radially outer end 310*a* of the grub screw 310, i.e. an end remote from the locking element 31, projects into or through the through hole 23, with the result that the grub screw 310 is blocked by a hole rim 22*a*, delimiting the through hole 23, of the belt shaft wall 22 and a further pivoting movement is prevented.

To prevent the grub screw 310 from being screwed out of the locking element 31 beyond a predetermined extent and, for example, to make it impossible for the grub screw 310 to fall out of the belt shaft 20, the radially inner end 310*b* of the grub screw 310, i.e. the end adjacent to the locking element 31, is provided with an end section which prevents the grub screw 310 from being screwed too far out of the locking element 31. Such an end section is shown by way of example in FIGS. 6 and 7 and is formed there by an unthreaded region.

The unthreaded end section of the grub screw 310 has the effect that, as the grub screw 310 is screwed out, the external thread of the grub screw 310 is braced mechanically with the internal thread of the locking element 31 in such a way that a secured end position of the grub screw 310 is guaranteed by the generation of a predetermined minimum torque when screwing out the grub screw 310; the application of the minimum torque during assembly when screwing the grub screw 310 out of the locking element 31 can be monitored and documented in a predetermined manner.

FIGS. 8 and 9 show another advantageous configuration of the grub screw 310, which prevents the grub screw 310 from being screwed too far out of the locking element 31. In the configuration shown in FIGS. 8 and 9, the radially inner end 310*b* of the grub screw 310, i.e. the end adjacent to the locking element 31, is formed by a screw head (e.g. in the form of a hammer head), which forms a stop that limits unscrewing.

In other respects, the above statements in connection with the configuration, described in FIGS. 6 and 7, of the end 310*b* of the grub screw 310 apply in corresponding fashion to the configuration with a screw head shown in FIGS. 8 and 9.

In a second preferred variant embodiment, as shown by way of example, in FIGS. 10 to 12, the securing element 32 is formed by a screw 320 which is screwed into the locking element 31 and the screw head 321 of which lies outside the belt shaft 20 both in the unlocking position and in the locking position. FIGS. 10 and 12 show the second variant embodiment in the unlocking position, more specifically in cross section and in a three-dimensional illustration; FIG. 11 shows the locking position in cross section.

The screw 320 projects radially into the interior of the belt shaft 20 through a tangentially extending elongate hole 24 in the belt shaft wall 22 and is screwed by means of the inward-projecting section into the locking element 31 and/or through the latter, thus ensuring that the screw 320 is firmly connected to the locking element 31.

The elongate hole 24 prevents further screwing into the locking element 31, in particular further screwing through the locking element 31, in the unlocking position of the locking element 31. In the locking position of the locking element 31, on the other hand, the elongate hole 24 allows further screwing into the locking element 31 or further screwing through the locking element 31, thus enabling the securing element 31 to be transferred from a non-securing position to a securing position.

To achieve this, in the exemplary embodiment shown in FIGS. 10 to 12, the elongate hole 24 is narrower than the screw head 321 in the region in which the securing element 32 passes through the elongate hole 24 in the unlocking position of the locking element 31, and is larger than the screw head 321 in the region in which the securing element 32 passes through the elongate hole 24 in the locking position of the locking element 31.

If the screw 320 is tightened in the locking position of the locking element 31, it is braced mechanically with the internal thread of the locking element 31 with the cooperation of the belt shaft wall 22 in such a way that a secured end position of the screw 320 is guaranteed by the generation of a predetermined minimum torque; the application of the minimum torque during assembly when screwing the screw 320 into the locking element 31 or through the latter can be monitored and documented in a predetermined manner.

Figure 14:
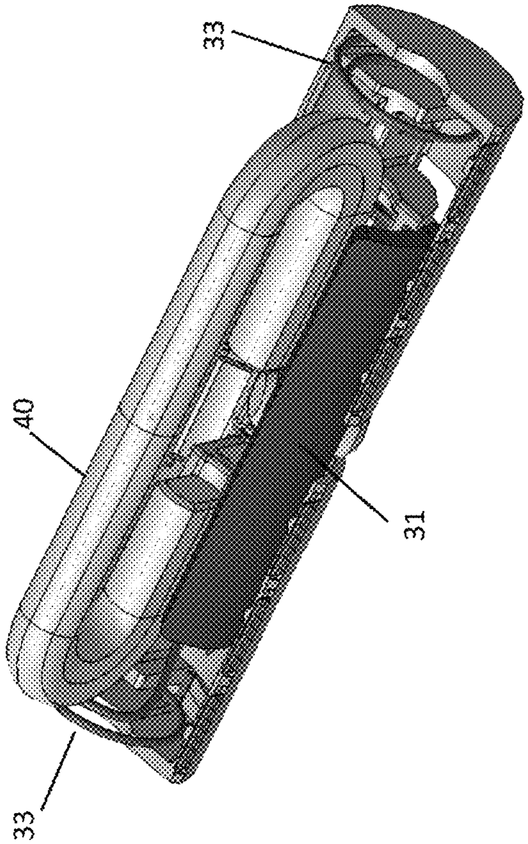
Figure 13:
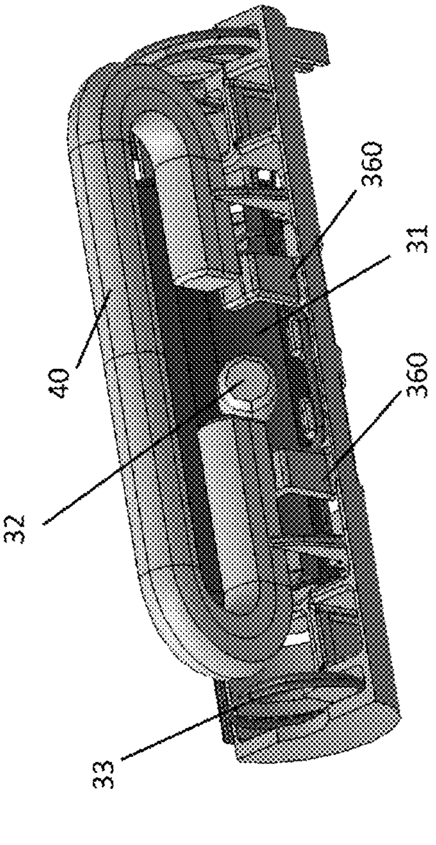
Figure 16:
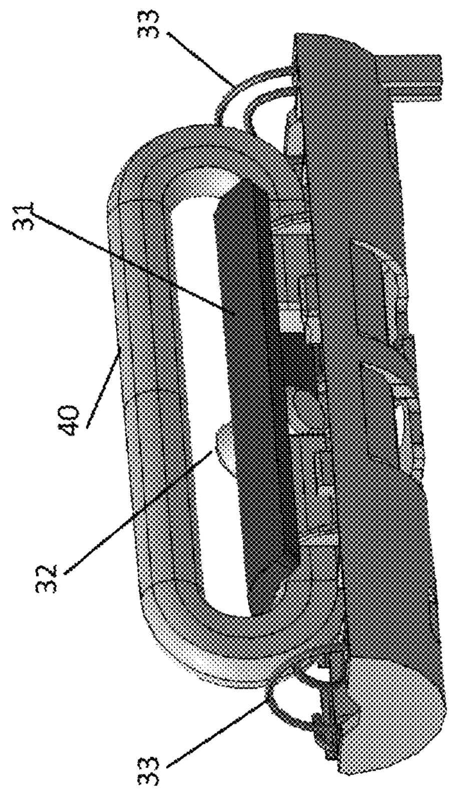
Figure 15:
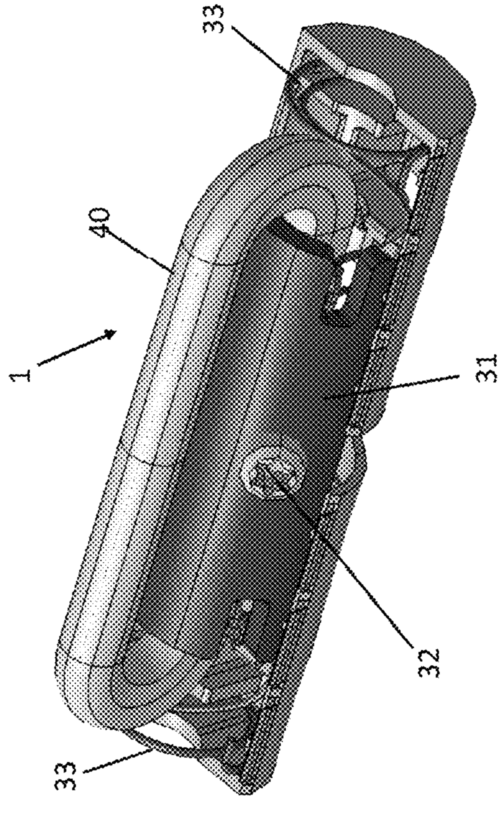

In order to prevent access to the securing element 32 before the locking of the fitting element 40, a cover 400 is preferably provided, said cover covering the securing element 32 while the locking element 31 is in the unlocking position. FIGS. 13-16 show components of a second exemplary embodiment for an end-fitting tensioner 1, which is equipped with a securing element 32 attached to a locking element 31. The second exemplary embodiment shown in FIGS. 13 to 16 differs from the first exemplary embodiment described above in the configuration of the locking device 30, in particular the configuration of the spring mechanism 33, which is preferably formed by a single spring, and the configuration of the unlocking mechanism. FIGS. 13 to 14 show the second exemplary embodiment in the unlocking position, and FIGS. 15-16 show the second exemplary embodiment in the locking position.

In FIGS. 13-16, it can be seen that the locking device 30 in the second exemplary embodiment replaces the locking lever 350 with an elastically displaceable or deflectable stop 360, which can be pressed down by the fitting element 40 (i.e. along the insertion direction of the fitting element 40), as a result of which the spring mechanism 33 of the locking device 30 is released, and the locking element 31 is shifted into the locking position. In other respects, the above statements in connection with the first exemplary embodiment and FIGS. 1 to 12 apply in corresponding fashion.

Figure 17:
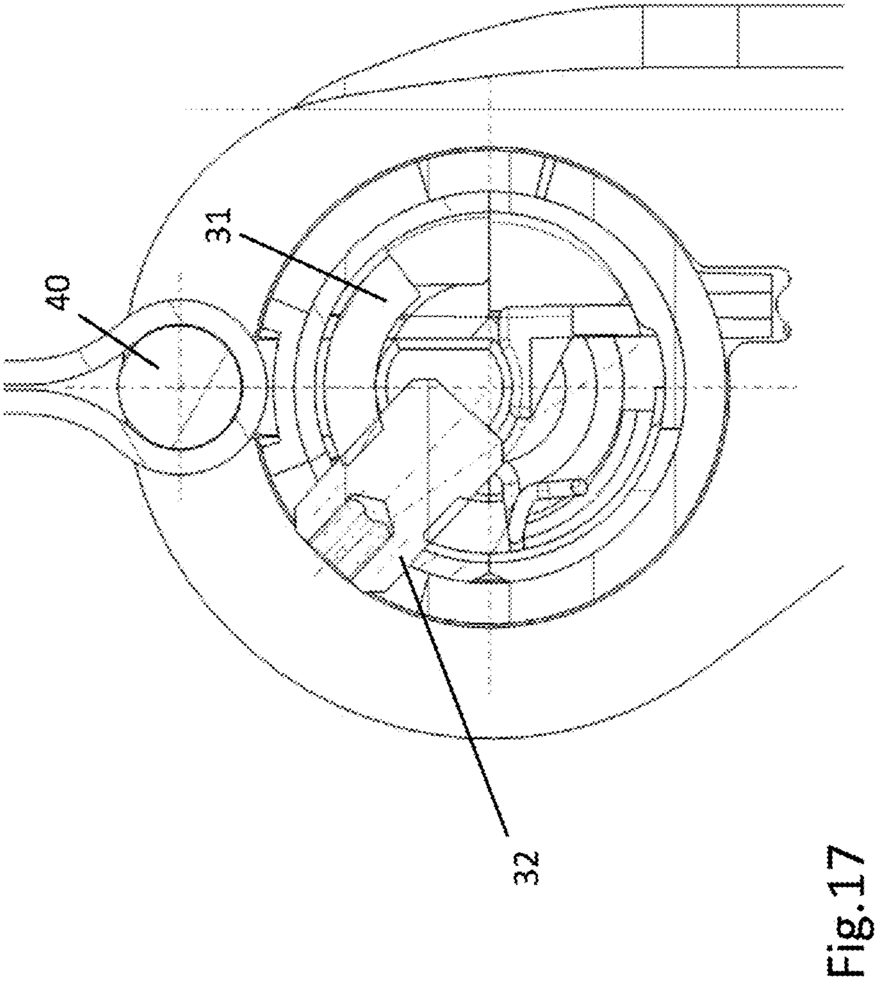

FIG. 17 shows a configuration of the second exemplary embodiment with a grub screw 310 as a securing element, more specifically in the locking position; in this respect the above statements in connection with FIGS. 2 to 5 apply in corresponding fashion.

Figure 19:
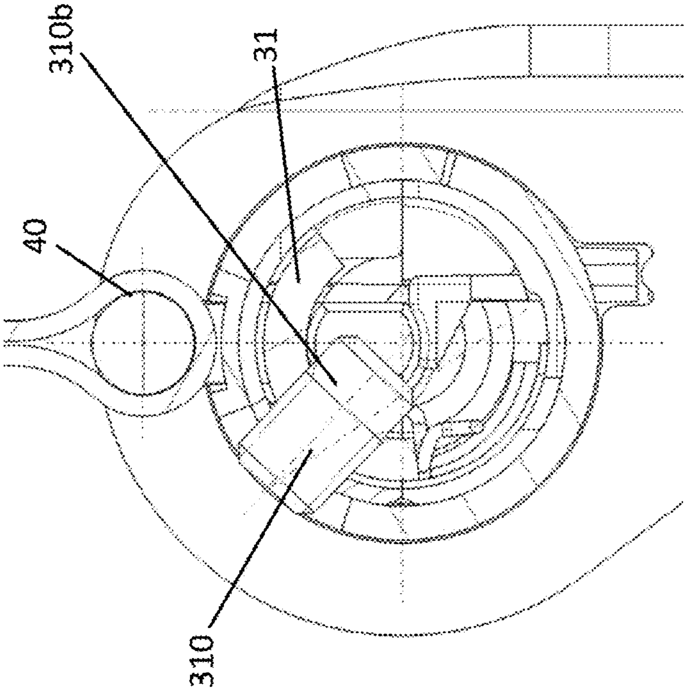
Figure 18:
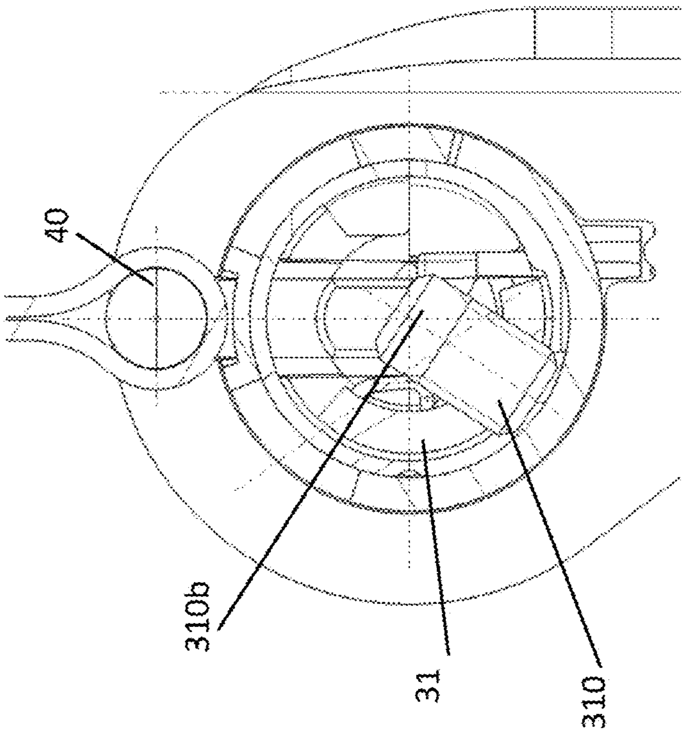

FIGS. 18 and 19 show a configuration of the second exemplary embodiment with a grub screw 310, the radially inner end 310*b* of which is of unthreaded configuration, thereby preventing the grub screw 310 from being screwed too far out of the locking element 31. FIGS. 18 and 19 show this configuration in cross section in the unlocking position (see FIG. 18) and in the locking position (see FIG. 19); in this respect, the above statements in connection with FIGS. 6 to 7 apply in corresponding fashion.

Figure 21:
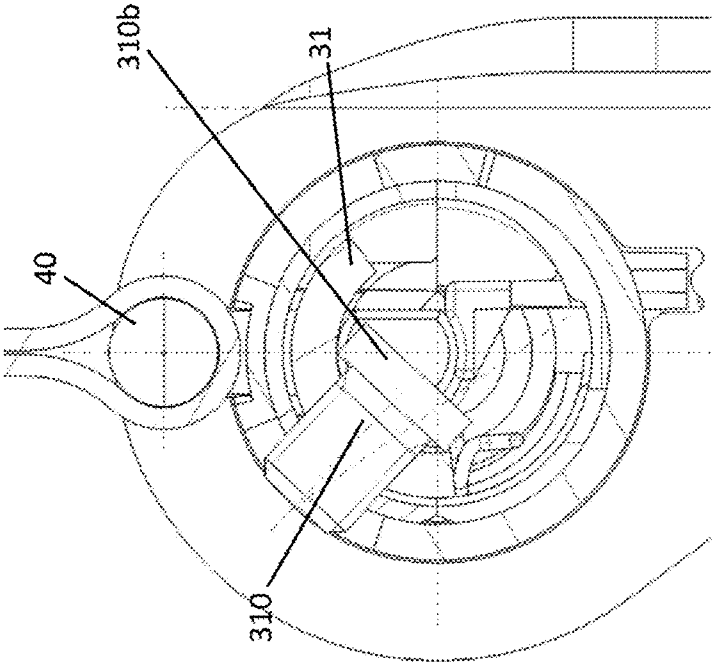
Figure 20:
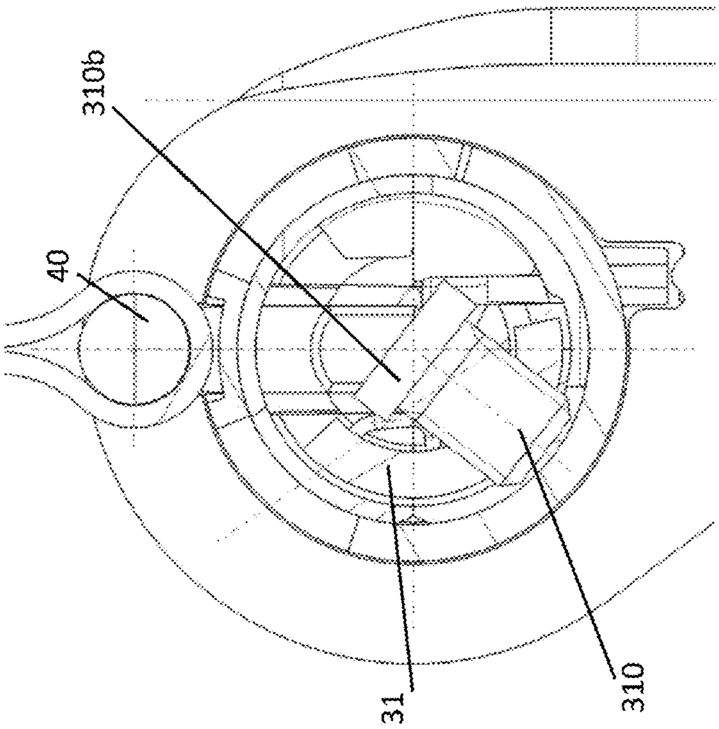

FIGS. 20 and 21 show a configuration of the second exemplary embodiment with a grub screw 310, the radially inner end 310*b* of which is provided with a radially widened screw head, thereby preventing the grub screw from being screwed too far out of the locking element 31. FIGS. 20 and 21 show this configuration in cross section in the unlocking position (see FIG. 20) and in the locking position (see FIG. 21); in this respect, the above statements in connection with FIGS. 8 to 9 apply in corresponding fashion.

Figure 22:
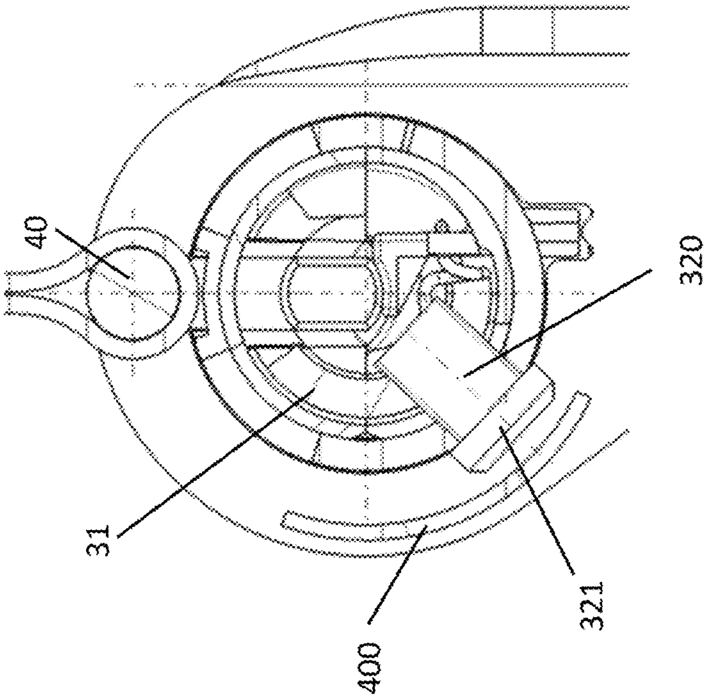
Figure 23:
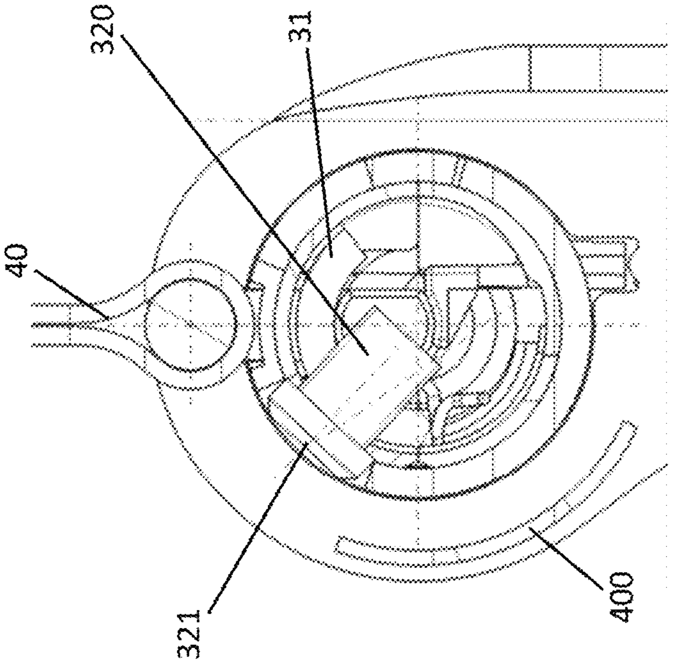

FIGS. 22 and 23 show a configuration of the second exemplary embodiment with a screw 320, the screw head 321 of which is situated radially on the outside. FIGS. 22 and 23 show this configuration in cross section in the unlocking position (see FIG. 22) and in the locking position (see FIG. 23); in this respect, the above statements in connection with FIGS. 10 to 12 apply in corresponding fashion.

In conclusion, it should be mentioned that the features of all the exemplary embodiments described above can be combined in any desired way in order to form other additional exemplary embodiments of the invention.

Moreover, all the features of dependent claims can each independently be combined with each of the additional independent claims, more specifically either in isolation or in any combination with one or more other dependent claims, in order to obtain other additional exemplary embodiments.

LIST OF REFERENCE SIGNS

1 end-fitting tensioner
2 safety belt
2*a* end
10 tensioning device
20 belt shaft
21 insertion slot
22 belt shaft wall
22*a* hole rim
23 through hole
24 elongate hole
30 locking device
31 locking element
32 securing element
33 spring mechanism
40 fitting element
310 grub screw
310*a* radially outer end
310*b* radially inner end

320 screw
321 screw head
350 unlocking lever
351 axis
360 stop
400 cover
S pivoting axis

The invention claimed is:

1. End-fitting tensioner (1) for a safety belt (2) comprising a tensioning device (10), a hollow belt shaft (20) configured to be driven in the winding direction by the tensioning device (10), and a locking device (30), configured to lock within the belt shaft (20) a fitting element (40) attached in a tension-resistant manner to one end (2*a*) of the safety belt (2), wherein the hollow belt shaft (20) comprises an insertion slot (21), through which the fitting element (40) attached to the safety belt (2) is configured to be inserted radially into the interior of the hollow belt shaft (20), wherein, when the fitting element (40) is inserted into the hollow belt shaft (20), the locking device (30) is triggered, and a movable locking element (31) of the locking device (30) is shifted from an unlocking position to a locking position that locks the fitting element (40) in the belt shaft (20), and wherein the locking position is configured to be secured by means of a securing element (32), characterized in that the securing element (32) is attached to the locking element (31) and is moved together with the latter during the shifting of the locking element (31) from the unlocking position of the locking element (31) into the locking position of the locking element (31).

2. End-fitting tensioner (1) according to claim 1, characterized in that the securing element (32) is covered with respect to the outside and inaccessible on the assembly side in the unlocking position of the locking element (31), and is exposed to the outside and accessible on the assembly side in the locking position of the locking element (31).

3. End-fitting tensioner (1) according to claim 1, characterized in that the locking element (31) is arranged so as to be pivotable about a pivoting axis (S) in the interior of the belt shaft (20), and is brought from the unlocking position into the locking position by pivoting about the pivoting axis (S).

4. End-fitting tensioner (1) according to claim 1, characterized in that the securing element (32) is arranged completely or at least in some section in the interior of the belt shaft (20) and, when the locking element (31) is pivoted about the pivoting axis (S), the securing element (32) is also pivoted about the pivoting axis (S) in the interior of the belt shaft (20).

5. End-fitting tensioner (1) according to claim 3, characterized in that the pivoting axis (S) and the axis of rotation of the belt shaft (20) are coaxial or formed by the same axis.

6. End-fitting tensioner (1) according to claim 1, characterized in that the securing element (32) is covered with respect to the outside by a wall section of a tubular belt shaft wall (22) of the belt shaft (20) in the unlocking position of the locking element (31), and is exposed to the outside and accessible on the assembly side via a through hole (23) in the belt shaft wall (22) in the locking position of the locking element (31).

7. End-fitting tensioner (1) according to claim 1, characterized in that the securing element (32) is configured to be moved radially outwards in the locking position of the locking element (31) at least until it projects into a radially outer through hole (23) in the belt shaft wall (22) of the belt shaft (20), and subsequent pivoting of the securing element (32) and thus of the locking element (31) is blocked by a hole rim (22*a*), delimiting the through hole (23), of the belt shaft wall (22).

8. End-fitting tensioner (1) according to claim 1, characterized in that the securing element (32) is a grub screw (310), which is screwed into the locking element (31) and is arranged completely in the interior of the belt shaft (20) in the unlocking position of the locking element (31) and, in the locking position of the locking element (31), is configured to be screwed radially outwards to such an extent, by being partially screwed out of the locking element (31), that an end (310*a*) of the grub screw (310) remote from the locking element (31) is blocked in respect of a pivoting movement by a hole rim (22*a*), delimiting the through hole (23), of the belt shaft wall (22).

9. End-fitting tensioner (1) according to claim 1, characterized in that the securing element (32) or a further securing element is arranged partially outside the belt shaft (20) and projects radially into the interior of the belt shaft (20) through a tangentially extending elongate hole (24) in the belt shaft wall (22) and is connected to the locking element (31) by means of the inward-projecting section.

10. End-fitting tensioner (1) according to claim 9, characterized in that the securing element (32) or further securing element is a screw (320) which is screwed into the locking element (31), the screw head (321) of which lies outside the belt shaft (20) and, in the locking position of the locking element (31), secures the locking element (31) in the locking position by being screwed further into the locking element (31) or through the latter.

11. End-fitting tensioner (1) according to claim 10, characterized in that the elongate hole (24) prevents further screwing into the locking element (31) in the unlocking position of the locking element (31) and allows it in the locking position of the locking element (31).

12. End-fitting tensioner (1) according to claim 9, characterized in that the elongate hole (24) is narrower in the region in which the securing element (32) passes through the elongate hole (24) in the unlocking position of the locking element (31) than in the region in which the securing element (32) passes through the elongate hole (24) in the locking position of the locking element (31).

13. End-fitting tensioner (1) according to claim 1, characterized in that the end (310*b*) of the securing element (32), which is adjacent to the locking element (31) is provided with an end section which prevents the securing element (32) from being moved, in particular prevents a screw (320) or grub screw (310) from being screwed, out of the locking element (31) beyond a predetermined extent.

14. End-fitting tensioner (1) according to claim 1, characterized in that the locking device (30) comprises a spring mechanism (33), which spring-loads the locking element (31) in the direction of the locking position, and the locking element (31) is shifted from the unlocking position into the locking position by the spring force of the spring mechanism (33) when the spring mechanism (33) is released as the fitting element (40) is inserted into the hollow belt shaft (20).

15. End-fitting tensioner (1) according to claim 14, characterized in that the locking device (30) comprises a single spring, which forms the entire spring mechanism (33).

16. End-fitting tensioner (1) according to claim 13, characterized in that the securing element (32) is a screw (320) or grub screw (310).

* * * * *